May 20, 1941. M. H. FRANK 2,242,519
OVERDRIVE GEARING
Filed July 30, 1937 6 Sheets-Sheet 5

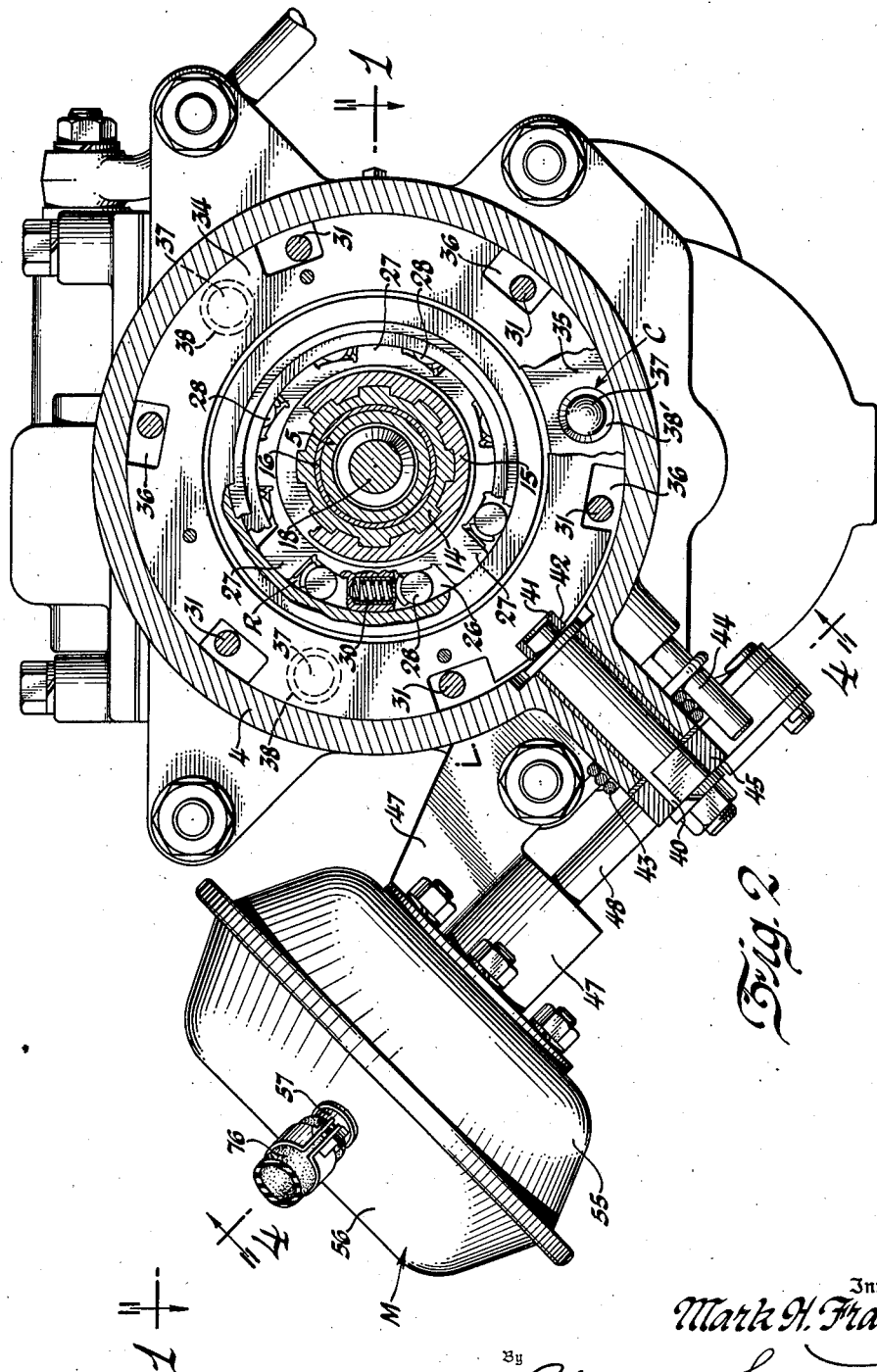

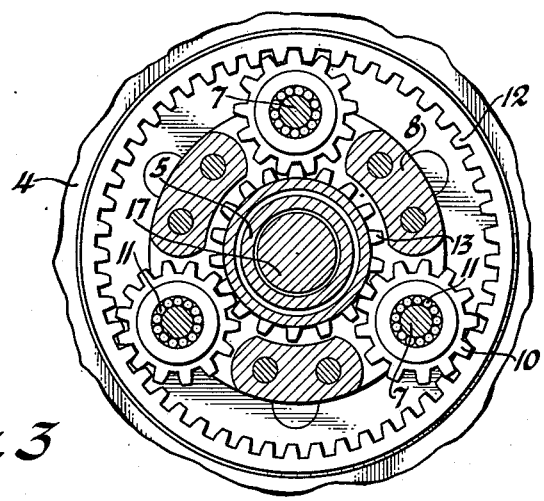
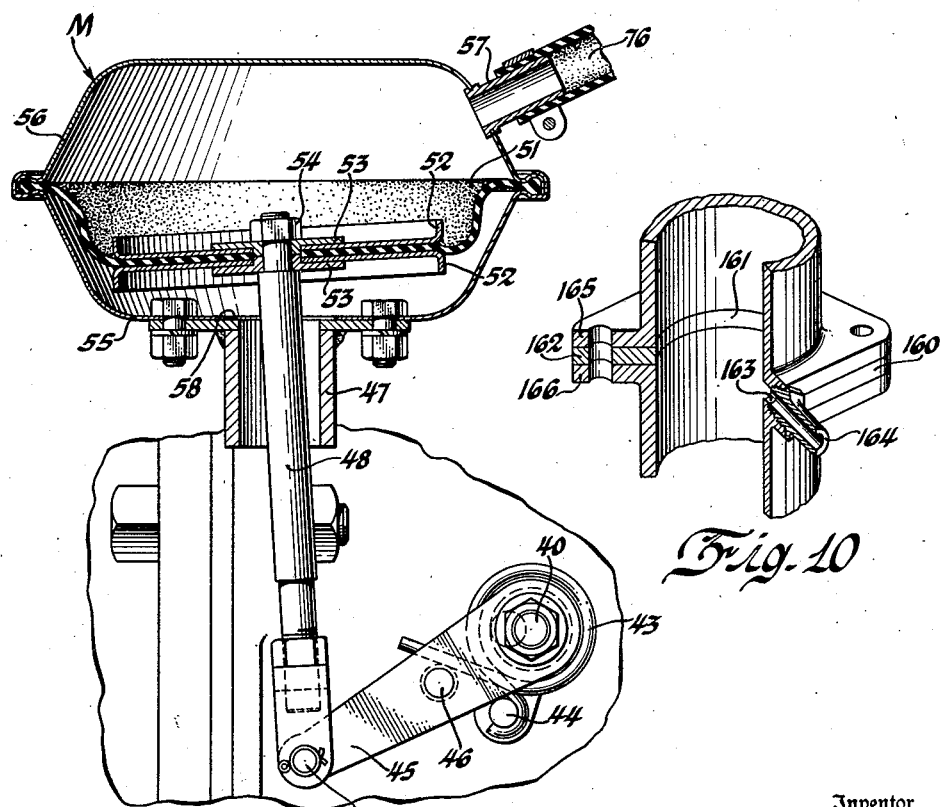

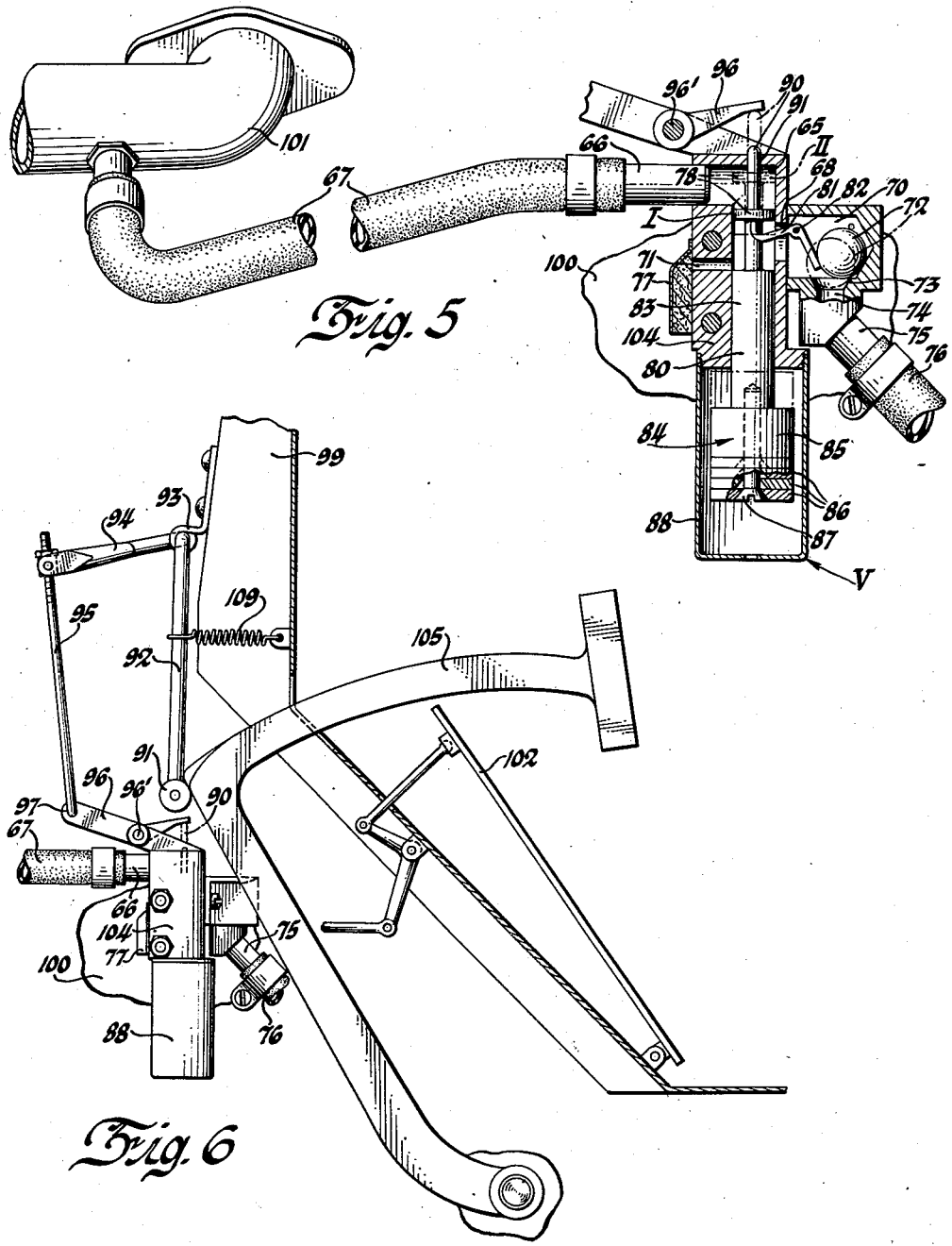

Inventor
Mark H. Frank
By
Blackmore, Sewer & Shur
Attorneys

Patented May 20, 1941

2,242,519

UNITED STATES PATENT OFFICE 2,242,519

OVERDRIVE GEARING

Mark H. Frank, Birmingham, Mich., assignor to General Motors Corporation, Detroit, Mich., a. corporation of Delaware Application July 30, 1937, Serial No. 156,534

21 Claims. (Cl. 74—472)

The present invention relates to change speed gear mechanism, and more particularly to such for automotive vehicles.

It is an object of the invention to provide a simple and efficient change speed gearing of the constant mesh type.

It is a further object to provide an arrangement of auxiliary gearing which yields additional speed ranges when applied to assemblies including present day gearboxes.

A further object is to provide the auxiliary speed ranges selectable for either acceleration or economy operation, and automatically controlled in such a way that no additional driver maneuvers in ratio control are required over those now in established practise.

The invention has for a further object the provision of manual means whereby such automatic control may be set aside during change speed operations in the standard gearbox assemblies, or when performance or acceleration speed ratios are desired.

An additional object of the invention is to utilize for automatic control a means responsive to the load and torque demand conditions on the engine, so that instant response of ratio shift may be afforded.

Further objects and advantages will appear in the following detailed description.

In the drawings:

Figure 2 is a vertical section taken at 2—2 of Figure 1, showing the external connecting controls for the auxiliary gear unit. Figure 3 is a section taken at 3—3 showing the gear relationships of Figure 1.

Figure 4 is a section taken at line 4—4 of Figure 2 showing the detail of the vacuum servomotor and ratio shifting mechanism.

Figure 5 provides the details of the valve control for the servomotor of Figure 4, shown in elevation section, as connected to the engine intake manifold.

Figure 6 is an elevation drawing of the control means superimposed upon the valve of Figure 5, showing the interconnection of the vehicle main clutch pedal with the valve mechanism.

Figure 7:
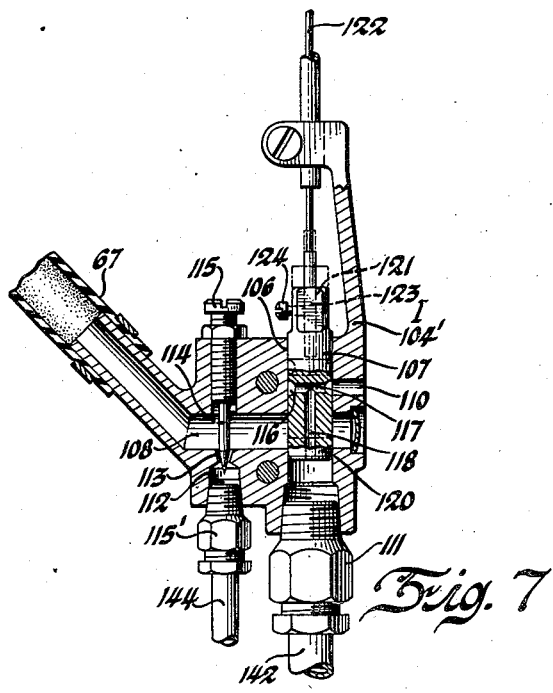

Figure 7 shows a modification of the valve control system of Figure 5, the parts being described in elevation section.

Figure 8:
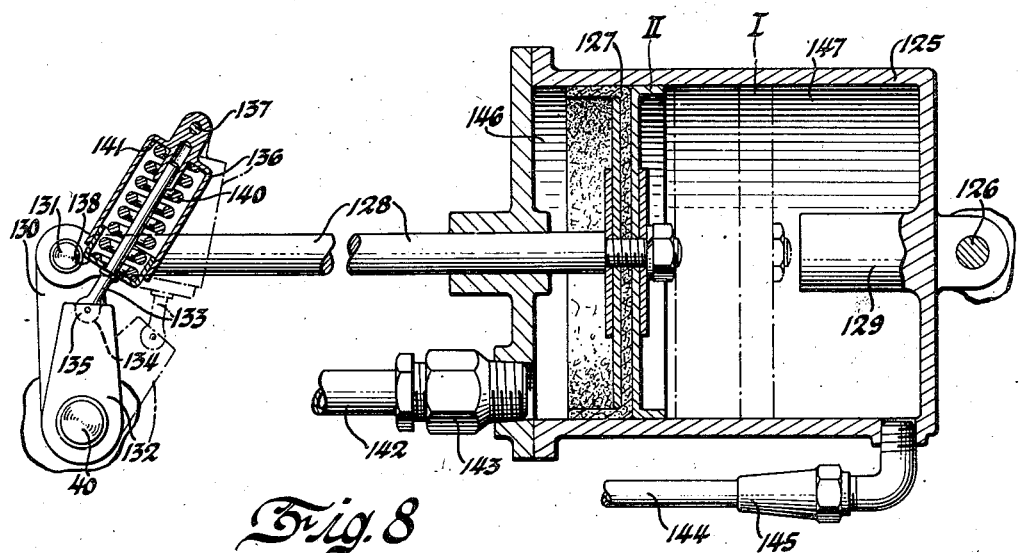

Figure 8 shows a modification of the vacuum servomotor device of Figure 4, to be used with the valve control of Figure 7. The servomotor of Figure 8 is mechanically connected to the external control system of Figures 2 and 4.

Figure 1:
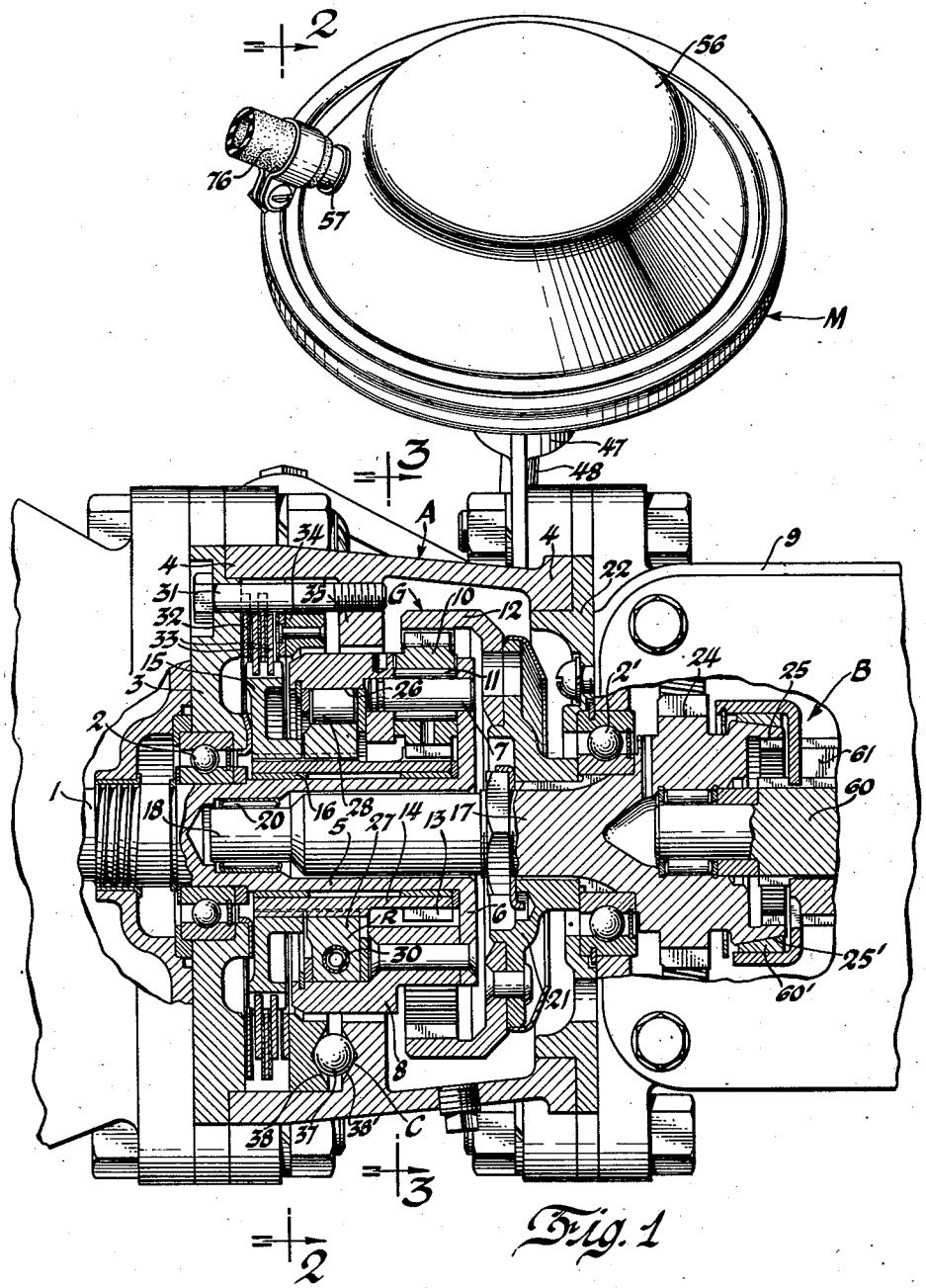
Figure 1 is a view of my invention as installed in a motor car, the auxiliary gear unit adjacent the engine being shown in transverse horizontal section; the standard gearbox being shown in part transverse section.
Figure 9:
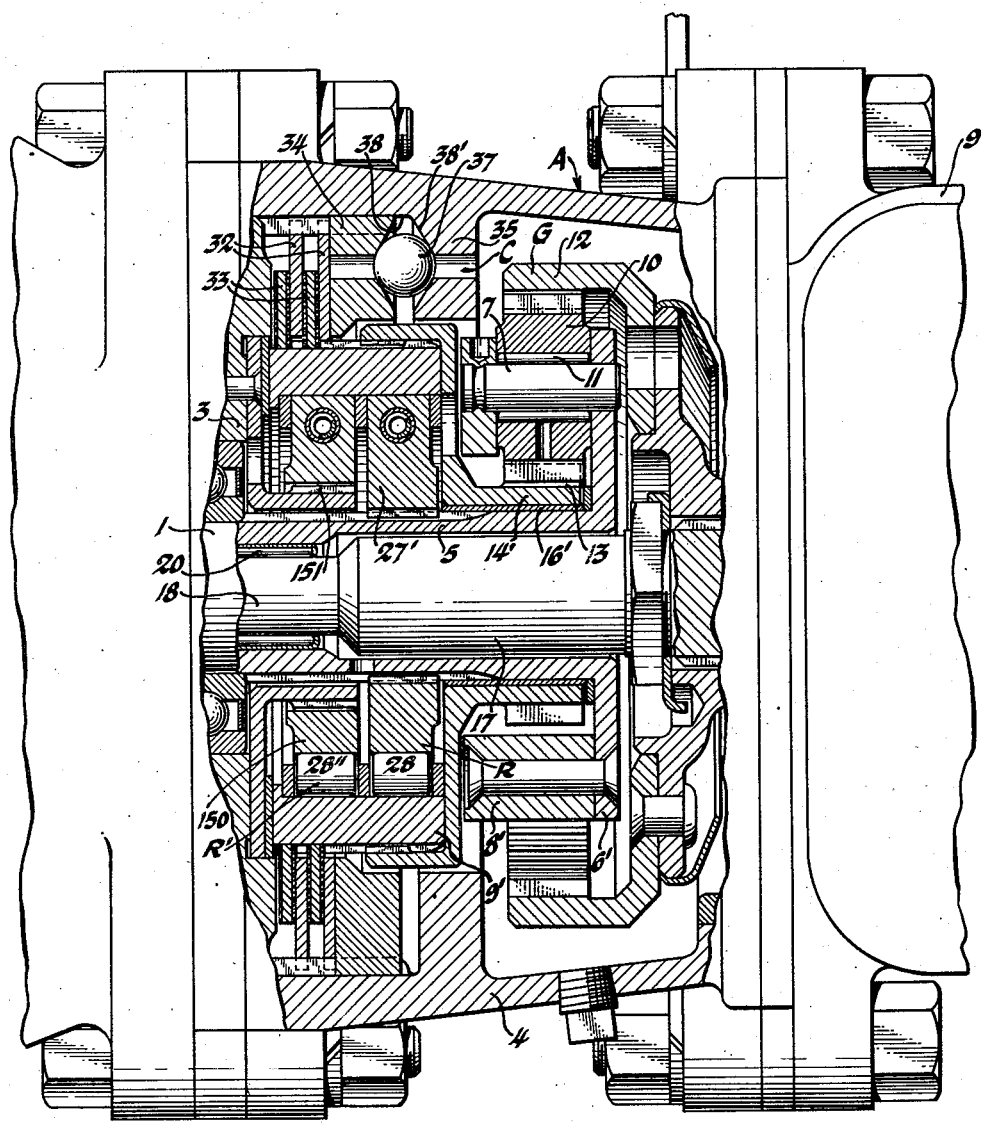

Figure 9 is an elevation section of a modification of the auxiliary unit of Figures 1 and 2, wherein a safety clutch is added, and a different reaction clutch construction is shown.

Figure 10 shows an alternate method of attaching the vacuum pipe of Figure 5 to the intake manifold system.

The showing of Figure 1 is of an arrangement of two gearboxes in series, between the engine and main clutch shaft 1 at the left; the transmission unit A adjacent the engine being a two-speed planetary gear, followed by a standard three-speed and reverse gearbox, designated by B.

The shaft 1 is supported in bearings 2 of web 3 of casing 4 attached to the main clutch housing by the customary bolts. The inner end of shaft 1 extends in sleeve 5 formed into yoke 6 carrying planet spindles 7 supported at their forward ends in carrier body 8. Planet gears 10 mounted on bearings 11 on spindles 7 mesh with annulus gear 12 and reaction sun gear 13 integral with hollow sleeve 14 splined to reaction drum 15. Sleeve 14 is free to rotate on sleeve 5 through bearings 16. The displacement of the gears is shown in elevation section in Figure 3.

The driven shaft 17 of the auxiliary unit is supported in bearing 2' of casing 9 and terminates at its forward end in a pilot spindle 18 supported within shaft 1 by bearing 20; and carries splined drum 21 riveted to the drum of annulus gear 12.

Web 22 of casing 4 supports shaft 17 through bearing 2'. The rearward extension of shaft 17 is formed into a main shaft gear 24 and direct drive clutch 25 for the standard gearbox B.

Friction surface 25' is cut on the extension of 17—24 to engage friction cone 60' splined on output shaft 60 to assist synchronization between the teeth of 25—61 as will be explained.

The forward extension of carrier body 8 is of drum shape, its inner portion being ground to form a race 26 for a one-way roller clutch R. Cam plate 27 splined to sleeve 14 carries rollers 28 energised by springs 30, arranged to grip race 26 unidirectionally. The roller clutch device will hereafter be referred to by letter R, shown in elevation in Figure 2.

Web 3 of casing 4 is held thereto by bolts 31, which latter act as keyways for friction discs 32, preventing their rotation. Mating friction discs 33 splined to drum 15 may slide axially within the limits of the plate spacing, as permitting by web 3, presser plate 34 and reaction plate 35 integral with casing 4. Presser plate 34 may rotate through a given angularity, because of circumferential slots 36 cut in the periphery, as shown in Figure 2. Torque-loading balls 37 are arranged between plates 34 and 35 in corresponding recesses 38 and 38' cut in the plates, so that when plate 34 is rotated with respect to plate 35, the initial contact of the discs 32 and 33 will be established. This clutch plate mechanism will hereafter be designated as the reaction brake C.

When the reaction brake C is engaged, sun gear 13 becomes a gear reaction member, and shaft 17 will be driven through the gearing at a speed ratio greater than unity, with respect to shaft 1. For convenience, the gearing of the planetary unit will be designated by letter G. When the reaction brake C is disengaged, the clutch R may become effective to establish drive, whenever the forces applied to sun gear 13 tend to cause it to rotate forward faster than the engine connected shaft 1.

As is well known in such gear mechanisms, overtaking torque such as when the car inertia is effective to transmit force through the gearing, as in coasting, or descending gradients, the sun gear 13 will have a negative force component, therefore clutch R cannot drive, and freewheeling will occur. If the vehicle should drift backward downhill with the main clutch engaged, the annulus gear 12 connected to output, will have a negative component, and since planet spindles 7 provide a fulcrum point, sun gear 13 will endeavor to rotate forwardly, causing clutch R to lock the sun gear 13 to body 8 and shaft 1, so that a stalled engine may be thereby started and the braking effect of the engine utilized to prevent the vehicle from getting out of control.

As shown in Figure 2, presser plate 34 is permitted limited rotational motion due to slots 36 and pins 31. External shaft 40 mounted radially in casing 4 may rock its eccentric 41 fitting slot 42 in plate 34, such that the rocking motion of the shaft 40 is transmitted to the plate 34. Coiled spring 43 is attached to stop pin 44 and hooked behind pin 46 of lever arm 45 as in Figure 4 fixed to shaft 40, normally biasing the shaft 40 to a position such that the recesses 38 and 38' of plates 34 and 35 are in register, and thereby balls 37 cannot energise the reaction device C.

Vacuum servomotor assembly M is bolted to casing 4 through fitting 47, its diaphragm rod 48 extending to pivot 50 joining it to lever arm 45. The direction of motion of rod 48 is at right angles to the centerline of shaft 40.

The detail of the vacuum motor is shown in Figure 4, the rod 48 being attached to diaphragm 51 through cups 52, washers 53 and nut 54. The outer edge of the diaphragm is gripped between the two shell halves 55 and 56, the lower one 55 being bolted to fitting 47; the upper half 56 having coupling nipple 57. Aperture 58 in shell 55 permits access of atmosphere to the lower side of diaphragm 51.

When vacuum is applied through coupling 57 to the diaphragm 51, the rod 48 and arm 45 are moved to overcome spring 43, and through the described elements, cause reaction brake C to be energised; when the vacuum is cut off, the spring 43 de-energises reaction brake C. Therefore, when vacuum is active in motor M, the auxiliary unit will be in overspeed ratio, and when it is cut off, the unit will be in direct drive.

It has not been deemed necessary to show the detail of the parts in the standard gearbox other than shaft 17 having gear element 24 and clutch element 25, and output shaft 60 having toothed element 61 engageable with element 25. The gearing arrangement therein is shown in U. S. S. N. 91,073, filed July 17, 1936, and the controls for said gearing are described in U. S. S. N. 137,648, filed April 19, 1937; the subject matter of the present specification being drawn to the auxiliary unit, its controls and arrangement with respect to the assembly in which it is placed.

In order to show a method for controlling the vacuum motor M, the following example is given. Valve body 104 of Figure 5 is mounted convenient to the power plant installation, on engine casing 100. Longitudinal bore 65 is right-angle ported at the upper end, terminating in nipple 66 connected to pipe 67 joining it to the engine intake manifold 101 which provides the vacuum force. Side port 68 leads to check valve chamber 70 and side port 71 leads to atmosphere. The chamber 70 is arranged to house ball check 72 which may seal the valve seat 73, and port 74 connected to nipple 75; the pipe 76 leading to vacuum motor nipple 57, of Figure 2. Air cleaner 77 filters the air passing in through port 71.

The upper boss 78 of valve 80 moves in a path to intersect the motion of lever 81 pivoted at 82, so that in the position shown in Figure 5 the lever 81 will hold ball check 72 off seat 73. The lower boss 83 of valve 80 may seal atmospheric port 71 when the valve is in the "up" position. The lower end of valve 80 terminates in composite weight member 84, composed of primary weight 85, and auxiliary weights 86 perforated to receive screw 87, for a purpose which will later appear. The valve assembly for control will be hereinafter referred to by the letter V.

Cylinder 88 of body 104 is open to atmosphere. The upper end of valve 80 terminates in pin 90 fitting closely the hole 91 drilled in body 104; providing a manually operable means for holding the valve 80 in the down position.

When the valve 80 is as shown in solid lines at I in Figure 5, the ball check 72 is held off its seat 73, and air from port 71 may flow through chamber 70 to line 76, and to the vacuum motor M, whence spring 43 compels release of the overdrive reaction device C. When the valve 80 is in the "up" position, as in dashed line II of Figure 5, the manifold vacuum is effective through chamber 70 to lift ball check 72 off seat 73 and through pipe 76 operate diaphragm 51 of the vacuum motor M. At this time, boss 83 seals atmospheric port 71. The reacting brake C is thereby energized and overspeed gear ratio established.

To provide automatic operation of valve 80, the dimensions of the porting are so taken that at high vacuum, such as when the engine throttle is at idle, the valve 80 is in position II. A sharp depression of the accelerator pedal of the engine will diminish the degree of vacuum present in the manifold very rapidly, whereupon weight assembly 84, 85, 86 of valve 80 will by gravity, move the valve to position I noted above. This response of degree of engine intake manifold vacuum to movement of the engine throttle is well known, and experienced by car drivers in observing relative speeds of windshield wiper motors.

Therefore the car driver may select a shift of the valve 80 to direct drive position I, by merely moving the accelerator pedal quickly toward open throttle position. Conversely, the driver may select a shift of the valve to overdrive position II, by relaxing the accelerator pedal, and allowing the degree of vacuum to build up.

The linkage of Figure 6 is to enable the driver to compel the valve to move to and remain in direct drive position I, while the gears are being changed in the standard gearbox. Main clutch pedal 105 moves in an arc to intersect roller 91 spindled to bent shaft 92 bracketed to the dash framing 99 at 93. Arm 94 of shaft 92 is pivoted to rod 95, the lower end of rod 95 fitting an eye 97 in lever 96 pivoted at 96' on the valve body 104. The opposite end of lever 96 intersects the motion of pin 90 of valve 80, so that when the clutch pedal 105 is depressed, as when disengaging the vehicle main clutch, the shaft 92 swings outward from the dash framing, the arm 94 rising with rod 95 to rock lever 96 to depress pin 90, and thereby hold valve 80 in the "down" position I. When the clutch pedal is relaxed to engaged position, the valve 80 may thereupon resume its automatic response to degree of vacuum and gravity effect, and spring 109 attached to 99 swings arm 92 back to engaging position for the next movement of 105.

The first increment of motion of the clutch pedal 105 may move valve 80 to position I without actual disengagement of the main clutch, so that the operator of the vehicle may enforce shift to direct drive at any time by slight clutch pedal movement, not sufficient to open the main clutch, so that for emergency acceleration in direct drive, either clutch or accelerator pedal may be used. This is a safety feature believed novel in this type of mechanism.

The showing of Figure 7 is to describe an alternative control method to that shown in Figures 5 and 6.

Valve body 104' attached conveniently to the power plant assembly, has longitudinal bore 106 in which atmospheric valve 107 may slide. Side port 108 leads to the engine intake manifold 101 through pipe 67 as in Figure 5, and side port 110 is open to atmosphere. Bore 106 terminates at its lower end in nipple 111. Needle valve port 112 and seat 113 intersect side port 108; threaded valve 114 and nut 115 permitting adjustment of air flow through port 113 and to the second nipple 115, threaded in body 104'.

The atmospheric control valve 107 has annular groove 116, cross port 117 and central port 118 opening to the inner face of the lower boss 120. The upper end of valve 107 is formed into a cup 121 fitting flexible cable plug 123, held by screw 124. Cable 122 is attached to clutch pedal 105, so as to move the valve 107 to the solid line position I, when the pedal is depressed, cutting off the air from nipple 115' and admitting air to nipple 111 only.

Attention is directed to the fixed operating differences in the porting leading to pipes 144 and 142, these differences being of predetermined area such that when valve 114 is properly adjusted by fitting 115, its area with respect to the effective area leading to pipe 142 will enable the automatic action, described in detail further, to take place. It should be noted that this differential porting connected to the two ends of cylinder 125 of Figure 8 is not a differential arrangement involving the atmospheric pressure, but establishes differences of vacuum, or sub-atmospheric pressure. Valve 107, during the ratio shift action controlled by the differential sub-atmospheric pressure, does not move, but merely opens manifold connection 108 to pipe 142. This effect is described in detail further.

In Figure 8, the vacuum servomotor cylinder 125 is shown bolted conveniently to the transmission assembly, pivotally anchored at 126.

The piston 127 slides in cylinder 125, and may abut stop 129, the piston rod 128 projecting forward to pivoted fitting 131 joining it to bell crank 130 attached to shaft 40 which is connected as described in Figure 2. The arm 132 of bell crank 130 is engaged by strut 133, in cylindrical recess 134, the rounded end 135 of strut fitting closely in said recess.

The bell crank 130—132 has limited motion such that point 135 may rock to intersect a line of centers between the center of shaft 40 and pivot 137 of spring cylinder 136. Strut 133 is mounted for longitudinal motion in the cylinder 136, and its affixed spring retainer 138 receives the thrust of spring 140 compressed between retainer 138 and the end wall 141 of cylinder 136. The spring 140 supplies force to affirm the position of shaft 40 in either the direct or overdrive positions, and replaces spring 43 of Figures 2 and 4 in the present modification, or may be used in combination with a yielding element such as spring 43.

Piston 127 in cylinder 125 is subject to atmospheric and subatmospheric pressure on both its faces, because of connecting piping 142 from nipple 111 of Figure 7 to cylinder end wall nipple 143, and pipe 144 from nipple 115' to cylinder end wall nipple 145.

As will be understood, a high vacuum in pipe 142 with a lower degree of vacuum in pipe 144 will tend to shift piston 127 to the solid line position II of Figure 8, which will rock bell crank arm 130 and shaft 40 to engage the reaction brake C in the auxiliary unit to establish overdrive ratio.

Conversely a diminishing of vacuum in pipe 142 while pipe 144 may sustain a higher degree of vacuum would tend to shift piston 127 to the dashed line position I of Figure 8 and thereby rock bell crank 130 and shaft 40 to release reaction brake C, thereby releasing the over-drive gearing G from drive, and permitting roller clutch R of Figures 1 and 2 to act.

The opening and closing of the engine throttle as determined by the driver in depressing or releasing the accelerator pedal 102 of Figure 6 varies the degree of vacuum in the manifold 101 and in the ported space 108.

When the degree of vacuum is high, the ported space 108 is subject to no atmospheric leakage via passage 118 in valve 107, since annulus 116 is not in registry with port 110 when the main clutch pedal 105 is in clutch engaged position. Whatever variations in degree of vacuum exist in pipe 67 and space 108, are transmitted more immediately to pipe 142 than to pipe 144 because of the restriction at 112—113, compared to the full flow permitted from 108 to nipple 111 and pipe 142.

If the drop in degree of vacuum is great enough to establish a differential pressure in the spaces 146 and 147 of cylinder 125, the resulting movement of piston 127 can overcome the camming load of spring 140 acting through 133—135, and snap the rocker arm 130 past center, thereby releasing reaction brake C and making clutch R effective, as has been described.

The snap-action above referred to may be regarded as a form of toggle action having two loaded end point positions as shown in Figure 8 in solid and in dashed line. The end point positions are sustained by spring 140 against forces of lesser value on piston 127, than capable of shifting the pivot 134—135 through center.

A sudden rise in the degree of vacuum in space 108 will have a greater effect in pipe 142 than in pipe 144 because of the restriction at 112—113, as previously noted. The resulting pressure differential in cylinder 125 will tend to shift the piston 127 to the right in Figure 8, and can again overcome the camming load of spring 140, and snap the rocker arm 130 past center, to engage reaction brake C and render clutch R ineffective.

The force of spring 140 is so taken with respect to the values of the available vacuum, the dimensions of the porting and piston 127, and the force requirement at reaction brake C, that excessive hunting is prevented, and the mechanism will not shift unless a definite differential pressure between the spaces 146 and 147 of cylinder 125 exists.

In using the words "differential pressure" herein, the phraseology is to describe the definite difference in pressure operative on either side of piston 127 in the end spaces 146, 147 of cylinder 125.

This combination of stored energy for predetermining the action of automatic speed ratio shift is believed novel.

When valve 107 is moved by depression of the clutch pedal to the lower position of the full lines in Figure 7, vacuum effect in line 142 is shut off at space 108 and air through 110, 116, 117, 118 flows into line 142 to space 146 of cylinder 125, leaving vacuum, however, to work through valve 114 at seat 113 and line 144 in space 147 to draw, and hold piston 127 to the right, thereby compelling direct drive in the auxiliary gear unit.

This arrangement is similar in function to the clutch pedal interlock of Figure 6, the just described modification, however, actually moving only the atmospheric valve 107, whereas the preceding arrangement is required to move both the vacuum valve and the ball check.

The system of Figures 7 and 8 is not to be confused with the so-called suspended vacuum system well known in clutch and brake operation in internal combustion engined vehicles. The method of control herein described is more accurately defined as a differential vacuum system, the differential of pressure in straight ported passages and spaces being the primary controlling force. This obviates a need for direct servo valving, the valve 107 simply serving as a cut-off means to inhibit the servo shift action. It should be noted that this portion of my invention covering the servo means provides for no neutral dwell, or non-active mid-position, but yields a full on-and-off shift alternation between two distinct speed ratio control conditions.

Needle valve 114 provides an extremely useful means to pre-set the response of the differential pressure operation, which in combination with the well-known diminishing vacuum effect at higher engine speeds, makes it possible not only to provide a reduced throttle pedal ratio control range in which a quick response is had for traffic maneuvering, but also to provide an advanced throttle pedal ratio control range in which a less sensitive response is had, thus tending to sustain overdrive and preserve a high degree of fuel economy at the high speed ranges. For average passenger car use, with the speed ratios as shown in the present demonstration, it is preferred to so select the physical constants of the vacuum system in conjunction with the setting of valve 114, that at car speeds above 70 miles per hour, the car driver may no longer be able to depress the accelerator sufficiently to vary the vacuum differential against spring 140 to shift from overdrive to direct drive.

This is a safety feature for saving the car engine from excess unloaded high speed revolutions, and from shock loading of the bearings and moving parts.

If any emergency occurs at such car speeds wherein the driver feels compelled to shift from overdrive to direct, a slight depression of the main clutch pedal 105, without unloading the main clutch, will move the valving in both control modifications herewith described, so that the overdrive gearing G ceases to drive.

A modification of interest is shown in Figure 9 with respect to the juxtaposition of clutch plates 32 and 33 and movable presser plate 34. Before shifting down from overdrive to direct the plates 33 are receiving a torque component of (+) positive sign, assuming normal clockwise rotation of the engine. This direction of torque reaction continues while the engine is driving the vehicle. When the vehicle overruns, the sign of torque reaction becomes momentarily (—) negative.

Now in shifting down from overdrive to direct in the gear assembly of Figure 1, the engine throttle is already advancing and torque reaction increasing on the plates 32—33 before spring 43 can become effective to release the brake C. When this torque reaction is increasing the clutch disc 33 splined to hub body 15 adjacent movable presser plate 34, transmits a positive (+) component thereto, while at the same time, the reduction of vacuum has permitted spring 43 to become effective. Since the spring 43 in releasing brake C must endeavor to rock the movable plate 34 negatively (—), any excessive (+) torque reaction opposes the full release of the brake C for a short time interval, while ordinarily permitting quick release when (—) torque reaction is normal or light. It is preferred to utilize a spring 43 of such force and mechanical advantage with respect to the motion of presser plate 34, that positive drag torque cannot disturb its immediate action of release upon diminishing of available vacuum.

In Figure 9 is will be noted that the non-rotatable reaction plate of the 32 group is adjacent the movable presser plate 34 whereas in Figure 1, the plate of the 33 group is so displaced. The Figure 9 version is to provide a means to eliminate the torque reaction drag from affecting the response of presser plate 34 to vacuum and to the action of spring 43, so that a comparatively light spring may be used, and consequently small force sustaining parts in conjunction therewith.

A further modification of structure in the clutch mechanisms is shown in Figure 9. The planet carrier 6' is riveted to a ring member 8', between which the spindles 7 are mounted, supporting planets 10 on bearings 11, meshing with annulus 12 and sun gear 13. Sun gear sleeve 14' runs on bearings 16' on the sleeve 5 of shaft 1. Sleeve 14' is joined to externally splined drum 9' which is internally ground to form races for two overrunning clutches R and R'. Clutch R in the present instance consists of a cam plate 27' splined to sleeve 5 of shaft 1, carrying rollers 28 similarly to clutch R of Figure 1. The cams of plate 27' are cut so as to permit freewheeling when the shaft 1 is rotating forwardly faster than sun gear 13. The second one-way clutch R' consists of a cam plate 150 splined to a flange 151 riveted to web 3 of casing 4. Rollers 28" occupy the cam interstices in a well-known manner. The purpose of clutch R' is to prevent retrograde rotation of drum 9' and sun gear 13 at all times. Its usefulness is first applicable when in freewheeling direct drive, as when the vehicle may be driving the engine and rollers 28 of clutch R would be inactive. Under these circumstances, with annulus gear 12 rotating forwardly faster than carrier 6', sun gear 13 would diminish to zero speed when the annulus-to-carrier speed difference equals the overdrive ratio of gearing G. The moment sun gear 13 receives a negative or retrograde component, roller clutch R' immediately couples the sun gear 13 to casing 4, and engine braking at overdrive speed ratio becomes available.

This is a safety feature of especial value in hilly country or on steep town gradients, wherein coasting of the vehicle might render car control hazardous because of bad wheel traction.

A further advantage is that roller clutch R' may upon relaxed throttle coasting on the straightaway, lock the sun gear 13 against rotation before the reaction brake C could be energised by engine vacuum. This relieves the discs 32—33 of having to absorb high torque reaction values, making it possible to make the reaction brake C small and compact.

Another advantage in the use of roller clutch R' is the means afforded for starting a stalled engine by towing. The arrangement of Figure 1, it will be noted, yields no engine braking unless the vacuum servo motor be active, so that a dead engine could not be started unless the vehicle be towed in reverse gear. The Figure 8 arrangement will start the stalled engine in overdrive ratio, with forward direct drive setting of the main gearbox.

In shifting gears in the main gearbox, the main clutch pedal interlock of Figures 5 and 7 on the automatic control for the auxiliary unit provides an exceptionally useful means for stabilizing the inertia relations of the rotating parts between the shafts 1 and 17. Without this control, the problem of obtaining adequate, easy synchronized shift in the main gearbox, as for example, between parts 61 and 25, would be greatly augmented by the variability friction loads and the inertias, during indeterminate shifting changes occurring in the automatic unit. With this control, the character of the inertias remains constant, the rotations of the main clutch driven plate, shaft 1 and connected parts applying fully only when the engine throttle is slightly opened; and a fixed value of inertia subtracted when the throttle is normally closed to idling. There is no rotating friction drag imposed on the rotation of shaft 17, so that with normal operation of main clutch and accelerator pedals, the clutch R by freewheeling, reduces the gear change interval inertia effect on shaft 17, permitting easy and proper functioning of the synchronization action in the main gearbox. In the modification of Figure 9 the same applies, in that only when the speed differential between shafts 1 and 17 exceeds the overdrive gear ratio, will clutch R' become effective as a preventer of uncontrolled freewheeling.

An advantage of my reaction device construction is that the discs 33—34 may be made entirely of metal, running in the normal lubricating oil of the transmission unit. Discs 32 are, however, shown as composite, having bearing metal facings working against steel alloy discs 33. Abruptness in engagement is forestalled by the trapping of an oil cushion between the splined member 15, presser plate 34, web 3 and casing 4. When plate 34 makes initial contact with the discs, the peripheral pocket in the aforesaid disc space is already filled by spinning of the rotating parts. Now as the presser plate 34 moves left as in Figure 1 or 9, the surface oil on the discs 33—34 must be squeezed out into a volumetric space where there is already a certain degree of existing pressure, which thereupon requires an appreciable time interval before the disc surfaces can be wrung dry for non-slip.

This cushioning action assures longer life of the discs, and prevents overheating since the required heat flow is spread out over a time interval in which the instantaneous temperature does not become excessive.

Figure 10 is given to describe a method of taking off vacuum servo power from the engine manifold which yields some advantages in stability of vacuum available. The flange fitting 160 has a large central aperture on throat 161 and bolt holes in ears 162. Side cut port 163 opens into throat 161 from nipple 164 inset in fitting 160. The fitting assembly is bolted between the regular carburetor mixture outlet and the intake manifold inlet flanges 165 and 166. Pulsations in engine speed are not as readily transmitted from this location in the main fuel mixture passage as in the construction of Figure 5, and further, the normal rate of change of vacuum degree is more uniform at this point than any other portion of the vacuum generating system.

In the preceding text, the individual operation of each of the assemblies involved in the invention has been described.

The car driver in operating my device, first declutches with the main clutch pedal 105 which puts control valve out of commission. The main gearbox is shifted to low, the clutch pedal 105 is relaxed, and the accelerator pedal 102 depressed to advance the motion of the vehicle. This latter action occurs such that the automatic ratio shift of the gear unit A may either be in overdrive by locking of device C or in direct by energisation of clutch R, as the driver maintains light throttle or advanced throttle.

If a traffic obstruction demands braking, the release of the accelerator pedal 102 immediately causes vacuum to build up, energising device C for overdrive, yielding engine braking; and upon clearing of the traffic, the depression of the accelerator pedal restores direct drive through clutch R, in the auxiliary unit.

Each time a gear change in gearbox B is made, the car operator should open the main clutch by depressing pedal 105, which, as described, puts reaction device C out of commission, and permits drive through clutch R, in direct only.

The flexibility added to car control by my device provides selective drive in two ranges of speed ratios, doubling the overall ratios provided by gearbox B. The ability to shift quickly from an economy ratio to a performance ratio at will by simply depressing or releasing the accelerator pedal is of outstanding value, in that the automatic control yields either with no additional effort or thought on the part of the car driver. In traffic, the accelerating performance of the ordinary powerplant is augmented, and on cross-country driving, the economy of operating at high car speed with low engine speed, fuel and oil consumption is instantly available.

Shift to reverse drive in gearbox B offers no difficulty with my invention in combination, since the direction of rotation of the auxiliary unit A is always positive with that of the engine. If the car drifts backward downhill, my arrangement of Figure 1 will couple the engine clutch shaft 1 so that a stalled engine may be used to augment braking, or else be cranked. The series arrangement of gearboxes A and B, with overspeed ranges afforded by unit A provides additional advantages in assembly and telescoping of parts for saving of space.

No claims are herein specifically directed to the gravity-actuation of valve 83 of Figure 5 since that is another invention. Claims are, however, directed to the interlocking control over the action of that valve, and over the action of the valve of Figure 7, the control method for changing ratio in the latter figure, in conjunction with the structure of Figure 8 being claimed herein as the invention of the applicant.

Whereas the disclosure of my invention has utilized examples of specific application, I do not limit the use of my invention to such installations, but reserve the right an apply it to various mechanisms in which driving torque is required to be transmitted at varying speed ratios. The invention is capable of modification in construction and arrangement without departing from its scope as expressed in the following claims.

I claim:

1. In power transmissions, in combination, control means for a variable speed gear unit comprising, fluid pressure means arranged to actuate changes of speed ratio in said unit, mechanical means arranged to reinforce the positioning of said fluid pressure means in definite speed ratio establishing positions, a differentially ported device cooperating with said fluid pressure means effective to establish changes in speed ratio according to predetermined variations in pressure, and variable with torque demand to change the fluid pressure effective in said device to establish the said changes in speed ratio.

2. In motor vehicles, in combination, an internal combustion engine having a vacuum space, a main clutch, a driving shaft, a driven shaft, manual control means for said clutch, actuating means operative to vary the speed ratio of said driven shaft with respect to the speed of said driving shaft, vacuum operated means connected to said space effective to control the operation of said actuating means, means responsive to variations in the suction of said space as determined by the working conditions in said engine to control said second named means, and auxiliary means made operative by said manual control means for said main clutch to render said vacuum responsive means ineffective.

3. In power transmission devices for motor vehicles, in combination. a driving shaft, a driven shaft, a main clutch arranged to connect said engine to said driving shaft, a variable speed transmission gear unit arranged to couple said shafts alternately in one of two ratios, actuating means including a lever effective to change the speed ratio of said unit, fluid pressure responsive means connected to said lever made operative thereupon by variations in the working conditions of said engine, a differentially ported device controlled by said variations to select actuation by said fluid pressure means, and means made operative by increasing and retarding movement of the engine accelerator pedal to select the actuation of said fluid pressure means, through predetermined coaction of said device.

4. In power transmission devices, in combination, an engine, a speed control for said engine consisting of a throttle pedal, a variable speed gearing unit driven by said engine connected to a load shaft, speed ratio actuating means for said unit comprising friction members rendered alternately operable by said means, reinforcing means adapted to load said actuating means for occupying definite speed ratio determining positions, fluid pressure operated mechanism adapted to control the movement of said actuating means and to overcome the action of said reinforcing means when shifting from one speed ratio to another of said gearing, including a differentially ported device subject to manually controlled fluctuations of fluid pressure, and means coacting with said device whereby predetermined movement of said engine speed control pedal is effective to vary the fluid pressure of said device in controlling the movement of said actuating means for alternate operation of said members.

5. In combination, a variable speed transmission unit, a ratio shifting lever arranged to be moved for increase and decrease of speed ratio within said unit, actuating means connected to said lever effective to shift it by fluid pressure to one of two definite ratio positions, reinforcing mechanism for said means adapted to sustain the effort of said actuation for maintaining the said lever in either one of said positions, and manually operable means arranged to vary the degree of the fluid pressure acting upon said means whereby the reinforcing mechanism may be overcome and the speed ratio of said unit may be increased or decreased.

6. In automatic speed ratio changing mechanism for automotive vehicles, an engine, a vacuum manifold for said engine, an engine accelerator pedal, a lever for shifting speed ratio of a variable speed transmission unit, vacuum responsive means subject to variations in the degree of vacuum of said manifold and controlled by normal movement of said pedal for selecting speed ratio of said unit, and connections between said means and said lever whereby the ratio shifting effect of the vacuum is utilized to establish the lever in either one of two speed ratio positions of said lever.

7. In automotive vehicles, the combination, an engine provided with a source of constantly available vacuum, means to vary the degree of said vacuum, a transmission driving shaft, a driven shaft, a first clutch operable to couple said shafts in driving and driven relation, a second member operative to couple said shafts through gearing, actuation means for permitting alternate operation of said clutch and said member and including reinforcing means effective to load said actuation means in one of said alternate positions, and a fluid pressure device comprising a two-position valve movable by changes in the vacuum provided by said engine for acting on said means.

8. In a motor vehicle, in combination, an engine including a driving shaft, a driven shaft, a main clutch, a pedal for operating said main clutch, a separate clutch operable to couple said shafts in one-to-one relation, a second member operable to couple said shafts through gearing, valve means operative by changes in the working conditions of the motor to establish alternate drive between said separate clutch and said member, and additional manual means worked by said pedal arranged to inhibit the action of said first named means at the will of the operator.

9. In speed ratio control mechanisms for motor vehicles, the combination of an auxiliary planetary gearing adapted to coact with the variable speed transmission of a motor vehicle, a differential pressure control device for said transmission, a one way clutch cooperating with said planetary gearing effective to establish one-to-one drive therethrough, a self-loading reaction member embodied in said planetary gearing arranged to establish drive through the gears thereof, means adapted to load said member when it is effective to drive, fluid pressure operating means subject to changes in the differential pressure of said device effective to actuate said reaction member and overcome said loading means, operator controlled means effective to establish alternate drive through said one way clutch or said reaction member, and supplementary manual means effective to inhibit the action of said operator controlled means.

10. In variable speed transmission devices for motor vehicles, in combination, a variable speed transmission unit driven by an engine a vacuum manifold for said engine, vacuum energised servo means connected thereto and effective to change ratio within said unit, a mechanism embodying friction elements within said unit arranged to establish drive through gearing, a differentially ported device controlling said means and subject to variations in the degree of vacuum of said manifold and effective to select speed ratio actuation of said means, and a torque responsive member embodied in said first named means arranged to coact with said device for establishing one of the speed ratios of said unit.

11. In fluid pressure servo devices for actuation of transmission speed ratio, in combination, a vacuum operated servo motor means arranged to change ratio in said unit, a first vacuum space in said motor means connected directly to a source of engine produced vacuum, a second vacuum space in said motor means connected to said source through restricted porting, and operator controlled means effective to vary the degree of vacuum in the said spaces of said motor, whereby said servo motor means is caused to shift from one ratio position to another in accordance with the movement of said operator controlled means.

12. In automatic control system for variable speed power transmissions, in combination, a variable speed transmission unit, an engine and a main clutch connected to drive said unit, a load shaft driven by said unit, fluid pressure servo means supplied by rotation of said engine, a fluid pressure servo motor connected to said means operative to change ratio within said unit, fluid pressure connecting means between said engine and said motor embodying a differential pressure ratio controlling device including a valve effective to control the operation of said motor, and connection between the operating means for said clutch and said valve effective to inhibit the action of said fluid pressure means and said device when said clutch is disengaged.

13. In power transmission devices, in combination, a variable speed ratio transmission unit, embodying a friction member arranged to establish drive through gearing, loading means effective to apply increased or decreased force on said member with increase and decrease in torque, fluid pressure means including a differentially ported device adapted to actuate and select changes in speed ratio by coaction with said member, and means responsive to the torque reaction of the drive through the gearing on said loading means of said unit for controlling the rate of actuation of said member.

14. In power controls for motor vehicles, in combination, a main clutch, a control for said clutch, a variable speed ratio transmission unit driven by said clutch embodying a drive reaction sustaining member, automatically operable means effective upon said member and for varying the speed ratio of said unit according to predetermined variations in the working conditions of said engine, and means effective upon a given movement of said control to inhibit the automatic action of said first named means and render the drive reaction sustaining member ineffective.

15. In power transmissions, in combination, an engine having a suction space, a main clutch driven by said engine, a variable speed transmission unit driven by said clutch, a manual control for said clutch, a vacuum servo motor connected to said space arranged to actuate changes of speed ratio in said unit, a control valve for said servo motor automatically responsive to variations in the degree of vacuum in said space, and connecting means joining said valve and said clutch control operative to inhibit the automatic action of said valve.

16. In variable speed controls, an engine, a main clutch driven by said engine, a pedal for engaging and disengaging said clutch, an automatically operable variable speed transmission unit driven by said clutch, a manually operable variable speed transmission unit driven by said first named unit, a manually operable control for said first named unit ratio shifter means operated by said manual control, and means connected to said control effective to inhibit the automatic operation of said first named unit upon clutch disengagement movement of said pedal whereby said second named unit may be operated freely without interference from the ratio shifting action of said first named unit.

17. In transmission ratio shifting mechanisms for motor vehicles, an engine, a speed control for said engine consisting of a throttle pedal, a fluid pressure supply provided by said engine, a servo motor comprising a cylinder and a piston movable in said cylinder between two speed ratio determining positions, a fluid pressure connection to said cylinder effective upon one face of said piston, a second fluid pressure connection to said cylinder effective upon the opposite face of said piston, and a differential pressure means joining said source with both said connections and subject to variations in the pressure of said source, said differential pressure means being responsive to predetermined movement of said speed control operative upon said source and said device effective to establish movement of said piston between the said speed ratio determining positions.

18. In power transmission devices, in combination, a variable speed gear comprising a power input shaft, a load shaft, and intermediary gearing including a reaction member, a one-way locking device arranged to connect said reaction member and said input shaft, effective to prevent said member from rotating faster than said input shaft, a friction means adapted to lock the said reaction member against rotation in either direction, operator-controlled mechanism effective to cause automatic energisation of said means, and a one-way locking device arranged to connect said reaction member and said housing, effective to prevent retrograde rotation of said member when said means is not actuated.

19. In automatic controls for automotive vehicles, in combination, an engine, a variable speed transmission connected to said engine and having a speed ratio determining lever, an intake manifold connected to said engine providing a variable degree of vacuum in accordance with the working conditions of said engine, a differentially ported device connected to said manifold, a vacuum servo motor connected to said device and arranged to position said speed ratio lever in at least one of its speed ratio establishing positions, and means controlled by the operator to establish predetermined variations in the vacuum existing in said device and effective upon said motor, thereby controlling the driving speed ratio determined by said lever in said transmission unit.

20. In variable speed transmission control devices, in combination, an engine, a throttle control for said engine, variable fluid pressure means supplied by rotation of said engine, a variable speed transmission unit connected to said engine through a main clutch, a speed ratio controlling lever for said unit actuable by said means, affirming means acting to hold said lever in one of two ratio determining positions and a differential pressure device having fixed orifices connected to said fluid pressure means effective to establish speed ratio actuation of said lever by said fluid pressure means at predetermined variations in said fluid pressure as determined by movement of said throttle control.

21. In power control devices, an engine, a variable speed gearing, servo means adapted to shift elements of said gearing embodying automatically operable mechanism arranged to select ratio between at least two distinct driving ratios of said gearing according to differential pressures, a throttle pedal controlling said engine effective to establish differential subatmospheric pressures in said mechanism varying with the torque demand, and a separate manual control connected to said mechanism operative to set aside the selection action of said mechanism in one position, and permit the said selection action in another position of said separate manual control.

MARK H. FRANK.